United States Patent [19]

Street et al.

[11] Patent Number: 5,781,443
[45] Date of Patent: Jul. 14, 1998

[54] APPARATUS FOR USE IN PARTS ASSEMBLY

[76] Inventors: William L. Street, 18912 Mueller Rd., Kiel, Wis. 53042; John G. Fruncek, 3924 N. Fairwell Ave., Shorewood, Wis. 53211

[21] Appl. No.: 741,260

[22] Filed: Oct. 30, 1996

[51] Int. Cl.[6] .................................................. G06F 19/00
[52] U.S. Cl. ........................... 364/478.02; 364/468.01; 414/273
[58] Field of Search ................... 364/478.02, 478.04, 364/468.01, 468.13; 414/273, 274; 29/701, 702, 703, 704, 707

[56] References Cited

U.S. PATENT DOCUMENTS

| | | | |
|---|---|---|---|
| 4,821,197 | 4/1989 | Kenik et al. | 364/478.03 X |
| 5,029,095 | 7/1991 | Kenik et al. | 364/478.03 X |
| 5,412,576 | 5/1995 | Hansen | 364/468.1 |
| 5,414,634 | 5/1995 | Morgan et al. | 364/478.02 |

Primary Examiner—Joseh Ruggiero
Attorney, Agent, or Firm—Jones, Day, Reavis & Pogue

[57] ABSTRACT

An apparatus for use in assembling kits of parts for use in manufacturing where workers pick the components or parts from bins that are stocked with the parts. The apparatus includes sensing means to detect the presence of a worker's hand in a bin and a display indicates the number of components in a bin that are to be retrieved or picked for a kit for a particular product. Once the sensing means senses the presence of a worker's hand in a bin, the display will be automatically dimmed for a predetermined time which is proportional to the number of components or parts which are to be taken from the bin. The apparatus is preferably configured so that adjacent modular units will not interfere with one another with respect to the sensing functionality and the sensing operation by the three detectors in each modular unit are also time multiplexed so that interference among the three is not experienced.

21 Claims, 8 Drawing Sheets

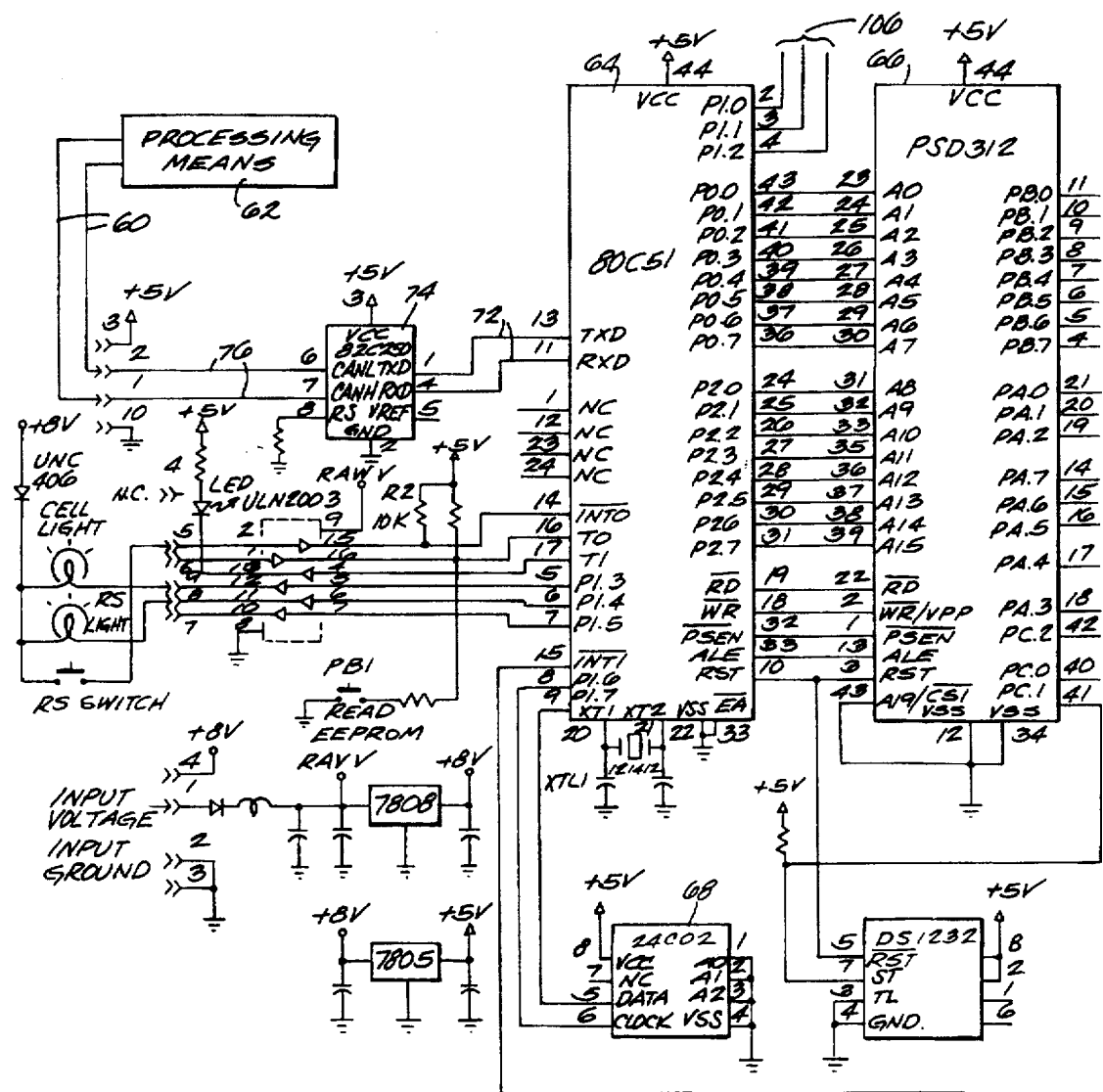
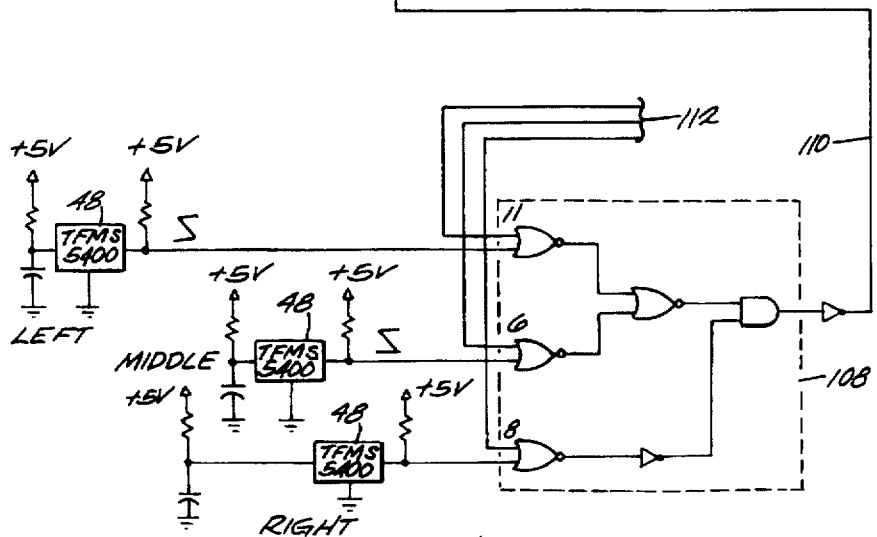
Fig. 8a

APPARATUS FOR USE IN PARTS ASSEMBLY

BACKGROUND OF THE INVENTION

The present invention generally relates to manufacturing, and more particularly to a system for assembling multiple component assemblies.

It is a well known and common problem in manufacturing of products having a plurality of components, and where the components are assembled into a kit for the kits to have an incorrect number of certain ones of the component parts, which results in reduced efficiency and increased manufacturing costs. There have been computer assisted semi-automatic component kitting systems that have been developed and used, such as Kenik et al. U.S. Pat. Nos. 4,821,197 and 5,029,095, both of which are assigned to the same assignee as the present invention. While the systems disclosed in the Kenik et al. patents provide benefits and have increased efficiency, there continues to be a need for improved apparatus and systems that aid in efficiently and reliably assembling kits that have the correct number of each component. It is also desirable to have a system which facilitates the picking of the correct number of parts from bins of parts during a kitting operation with the system operating in a manner whereby the worker does not have to do any separate verifying actions apart from gathering the correct number of parts that are called for in the product being kitted.

Accordingly, it is a primary object of the present invention to provide such an improved system and apparatus for assembling parts, which increases the efficiency of the workers and the reliability of the accuracy of the assembly which is being kitted.

Another object of the present invention is to provide such a system which requires no conscious activity by the worker in assembling components other than to pick the correct number of components from the appropriate bins. This eliminates any external or extraneous activity apart from the work at hand, which increases the efficiency of the worker.

Another object of the present invention is to provide such an improved system which reliably senses the presence of a hand inserted into a bin for removing components.

A related object lies in the provision for automatically adjusting the sensing mechanism to effectively exclude background noise and insure reliable operation.

Still another object of the present invention is to provide such an improved system which utilizes infrared radiation and detectors which are modulated at a predetermined frequency so that light at other frequencies will not affect the detector and produce false sensing of worker's hands being in a bin.

Yet another object lies in the provision of providing modular units containing a predetermined number of light emitting means and light detecting means and multiplexing the operation of these means on each unit so that only one light emitting means is operating at a time.

A related object lies in the provision for providing a different multiplexing duty cycle for adjacent modular units so that interference caused by light being emitted from an adjacent modular unit will not affect a given unit.

Yet another object of the present invention is to provide such a system which reliably detects the presence of a worker's hand in a bin and whereupon the detection causes a display to be dimmed for a predetermined time that is adjustable, but which is desirably of such a duration that is proportional to the number of components that are to be removed from the particular bin. In this way, the system provides an indication to the worker as to how long it should take to pick the correct number of components from each bin.

Another object of the present invention is to provide such a system that is manufactured from relatively inexpensive electronic components, and yet provides optimal and effective performance that is normally associated with components of greatly increased cost.

Other objects and advantages will become apparent upon reading the following detailed description, while referring to the attached drawings, in which.

Figure 6:
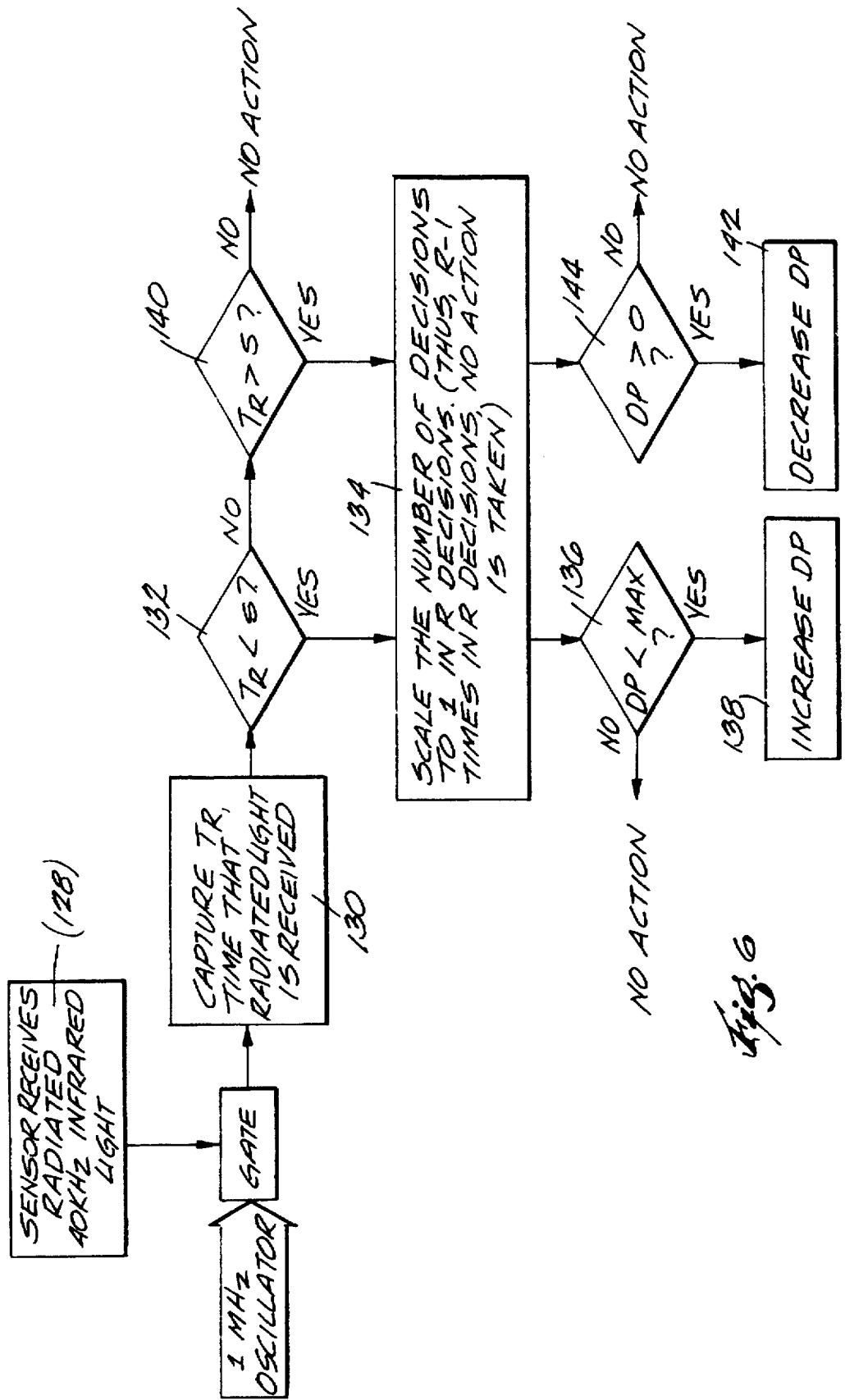
Figure 7:
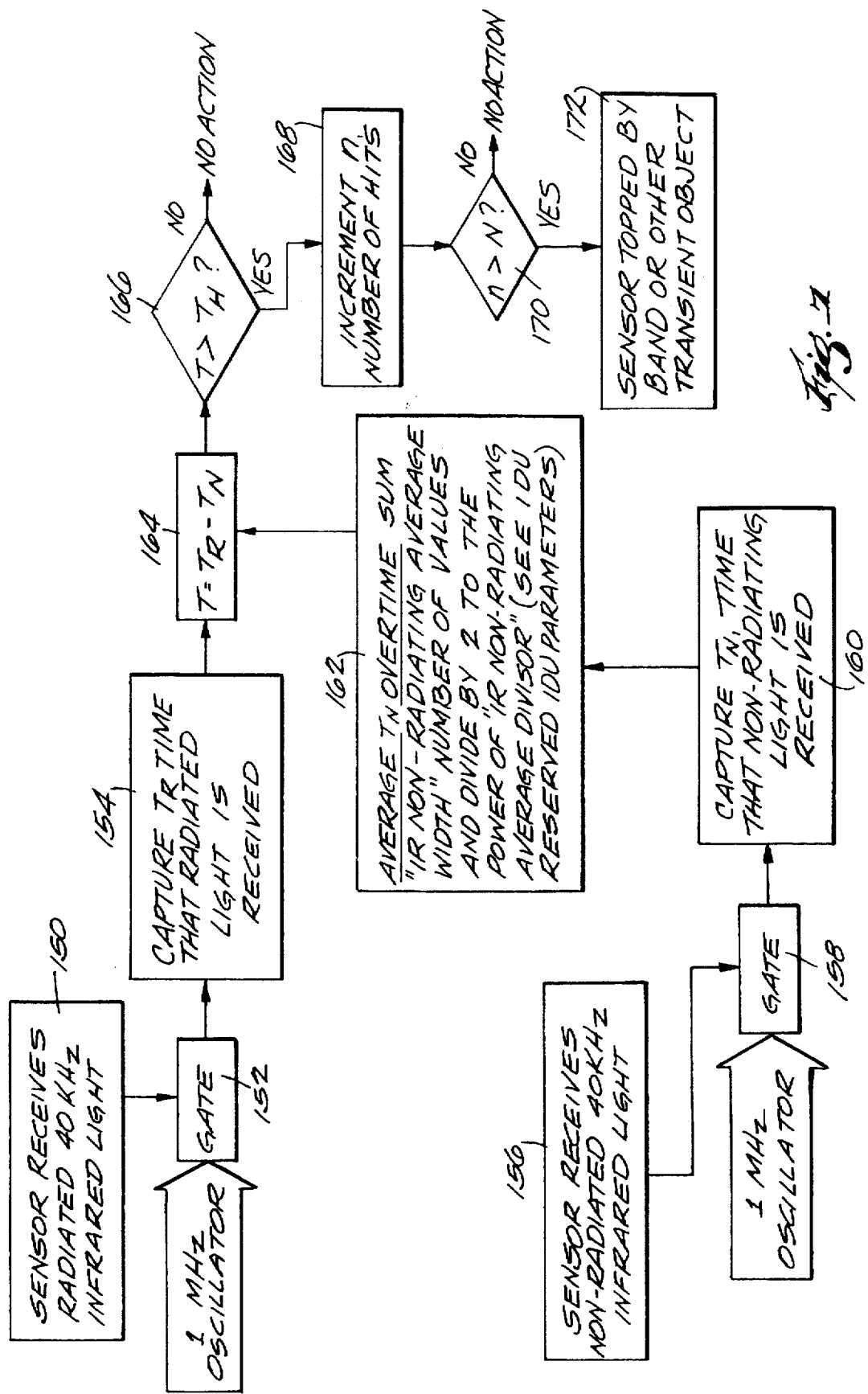
Figure 8B:
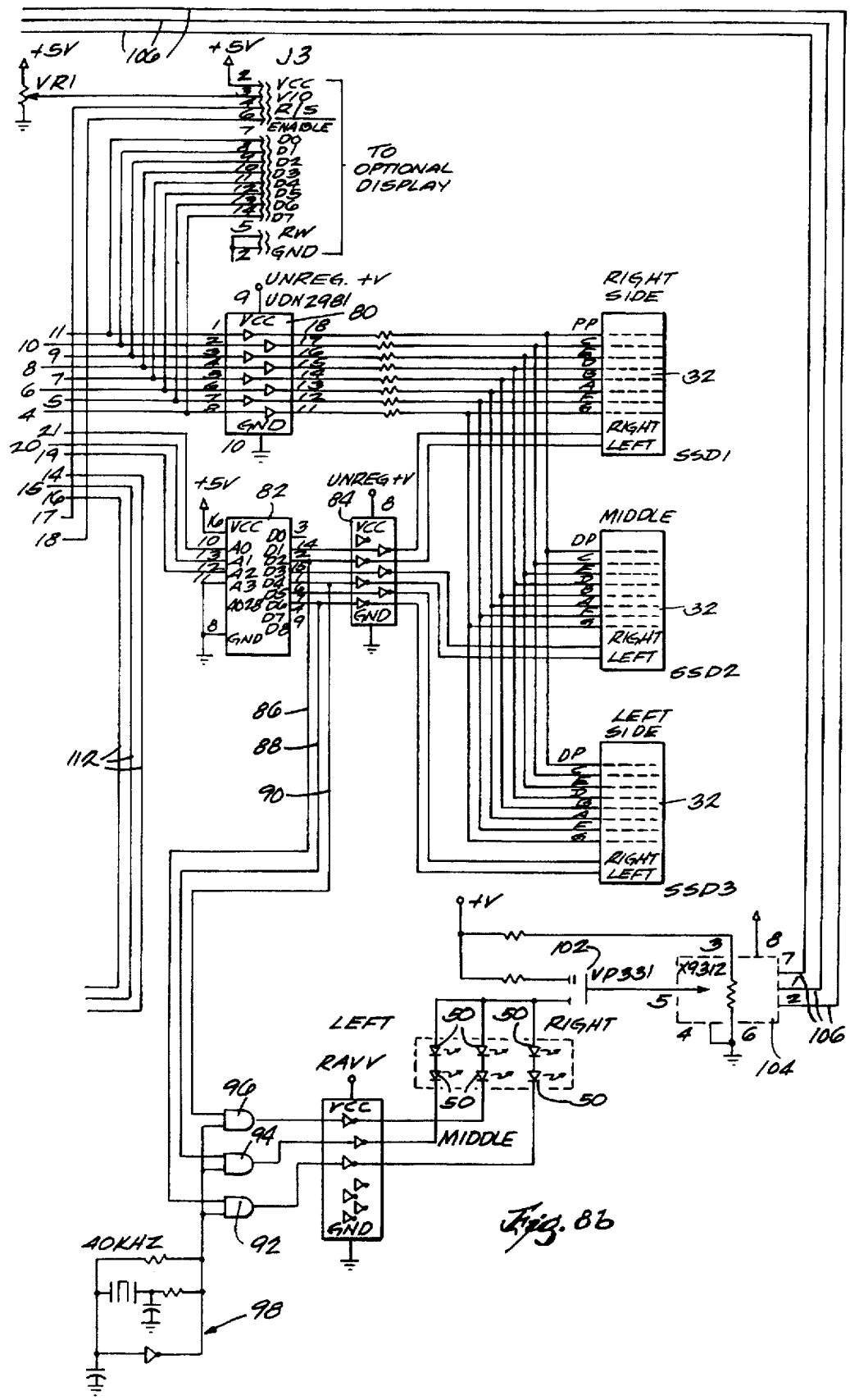

FIG. 6 is a flow chart illustrating the routine for calibrating an inactive sensing means; and FIG. 7 is a flow chart illustrating the routine for determining the presence of a worker's hand or other transient object; and FIGS. 8a and 8b together comprise an electrical circuit diagram of a modular unit together with a concentrator processing means which is adapted to be connected to a plurality of such modular unit circuits.

DETAILED DESCRIPTION OF THE PREFERRED EMBODIMENT

Broadly stated, the present invention is directed to an apparatus or system for use in assembling kits of parts for use in manufacturing a product by workers who picks the components or parts from bins that are stocked with the parts. Such kitting operation enables the gathering of all necessary parts so that the product can be built in an area of the manufacturing plant or at another location. The system is also adapted for use in filling orders generally, or for use on an assembly or for placing and controlling inventory. When kits are assembled, there is always a reliability problem in having the correct quantities of all parts that are supposed to be in a particular kit. This can be difficult to achieve, particularly when similar products require different part counts, for example.

The present apparatus or system is adapted to promote efficiency and accuracy in such kitting operation by the use of a unique sensing means as well as a display for workers who are assembling such kits. The sensing means is effective to detect the presence of a worker's hand in a bin and the display indicates the number of components in a bin that are to be retrieved or picked for a kit for a particular product. Once the sensing means senses the presence of a worker's hand in a bin, the display will be automatically dimmed for a predetermined time which is proportional to the number of components or parts from the bin which are to be placed in the kit. For example, if there are four connectors to be retrieved from a bin, the number 4 is displayed on the display. When the worker's hand enters the bin to obtain those four connectors, the display will dim for a period that represents the expected time that it would take for four connectors to be removed and then the display is extinguished. If eight of such connectors were to be retrieved, then the time from detection to extinguishing the display would be approximately double that for four connectors.

The system is comprised of modular units which can be used for preferably three minimum sized bins, and which modular units can be combined with one another and controlled so that bins of varying sizes can be used for unusual sized parts or components that are to be kitted. For example, each modular unit covering three minimum sized bins can be combined with other units to make a bin that may have a length of six or more minimum size bins. If desired, there can be a single display for each bin that is operable to display the number of components that are to be removed from that bin, regardless of the size of the bin and the detecting mechanism of each modular unit is fully operational so that a hand inserted into a large bin will be detected by at least one of the detecting mechanisms. The system is preferably configured so that adjacent modular units will not interfere with one another with respect to the sensing functionality and the sensing operation by the three detectors in each modular unit are also time multiplexed so that interference among the three is not experienced.

Figure 1:
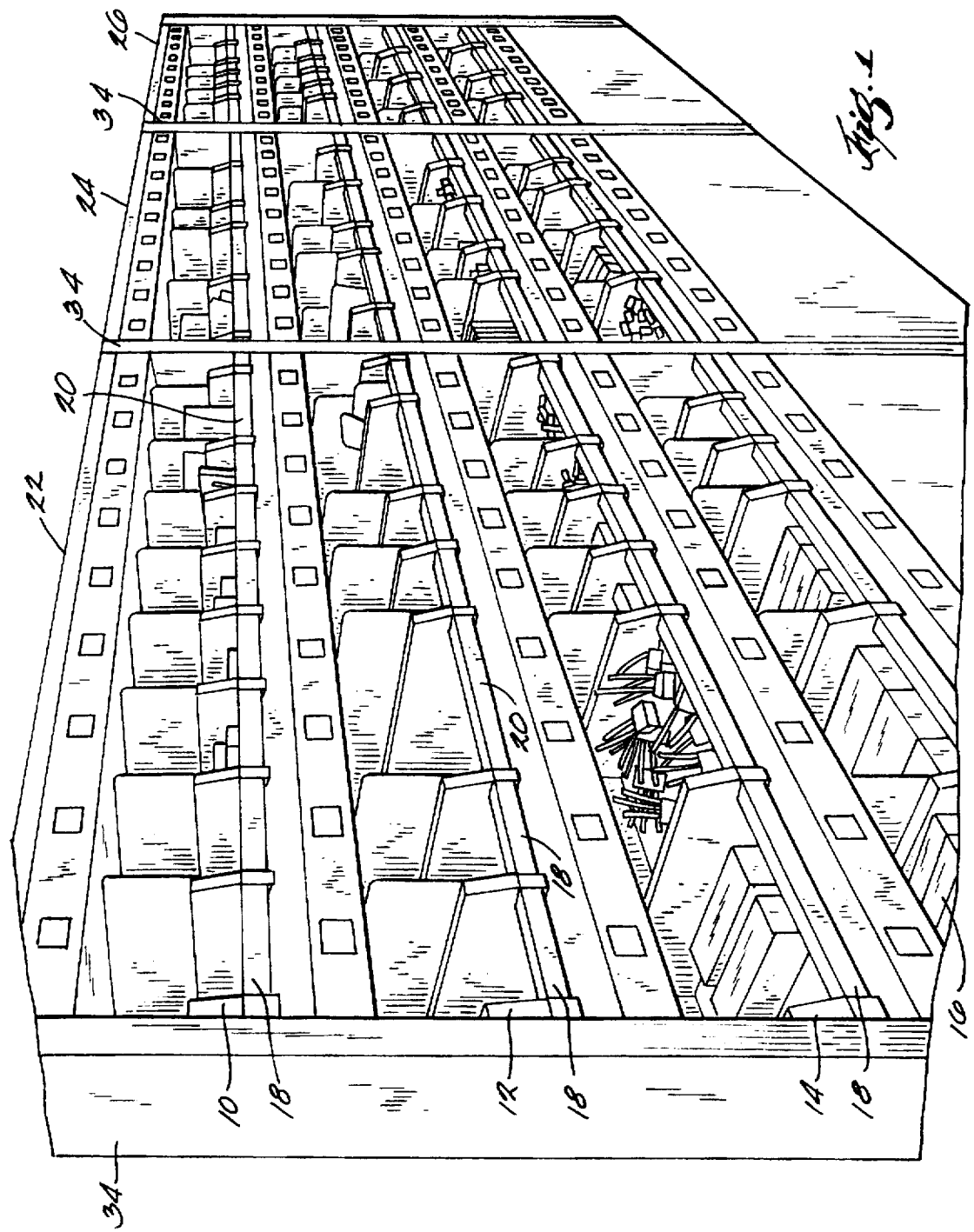
FIG. 1 is a perspective view of a system embodying the present invention and illustrating a number of rows of bins of various sizes located in three separate cells.

Turning now to the drawings, and particularly FIG. 1, the system embodying the present invention is shown to comprise a number of rows 10, 12, 14 and 16, with each row being part of a cell having a plurality of bins. The system has bins 18 which are minimum sized bins and bins 20, which are double-sized bins as shown in the drawing. Also, FIG. 1 particularly illustrates three separate cells 22, 24 and 26. Also, as shown in the drawing, there are nine minimum sized bins in each row of each cell and are comprised of three modular units that are mounted adjacent one another. While not illustrated, it is possible for a particular bin to be larger than the double-sized bins 20, if desired, to accommodate larger parts or components.

Figure 2:
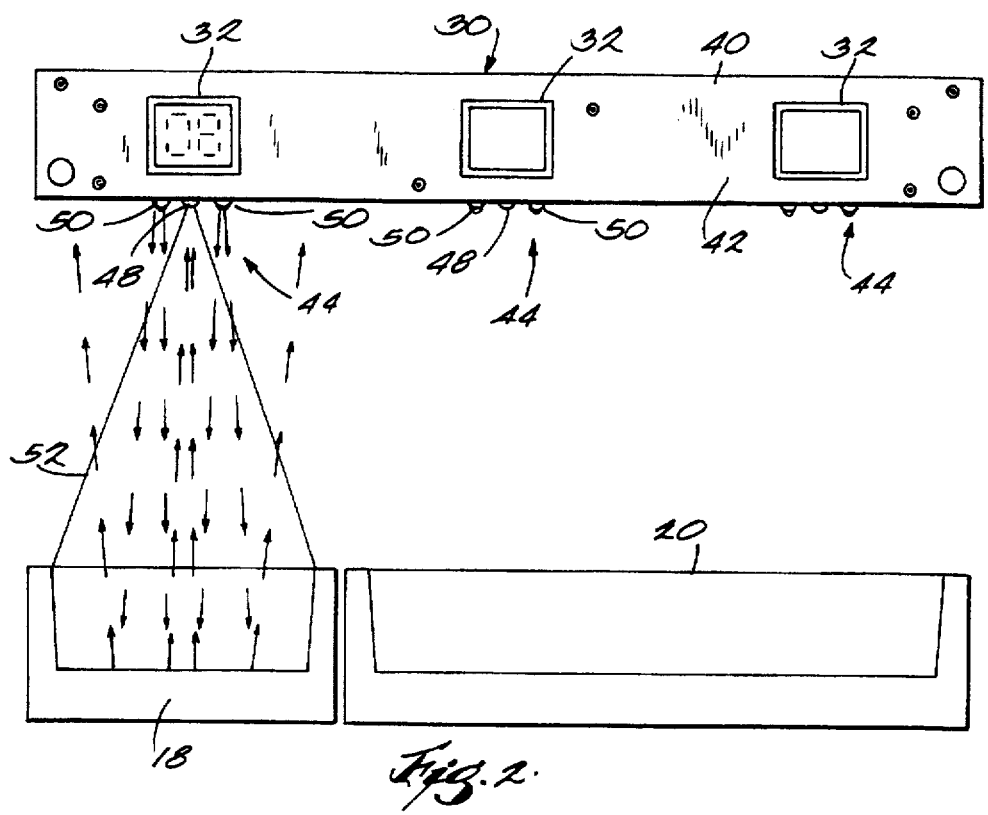
FIG. 2 is a simplified representation of the front of a display module embodying the present invention and shown with two bins of different sizes.
Figure 3:
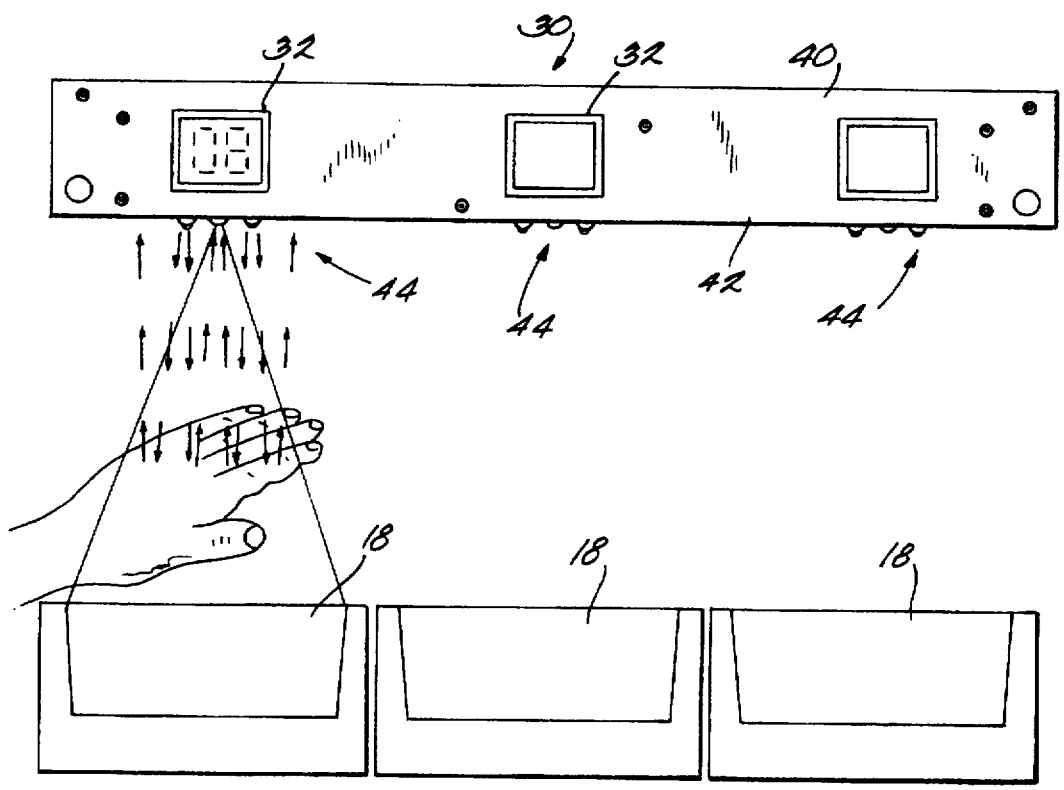
FIG. 3 is a view similar to FIG. 2, but illustrating a worker's hand being present in one of three minimum sized bins.
Figure 4:
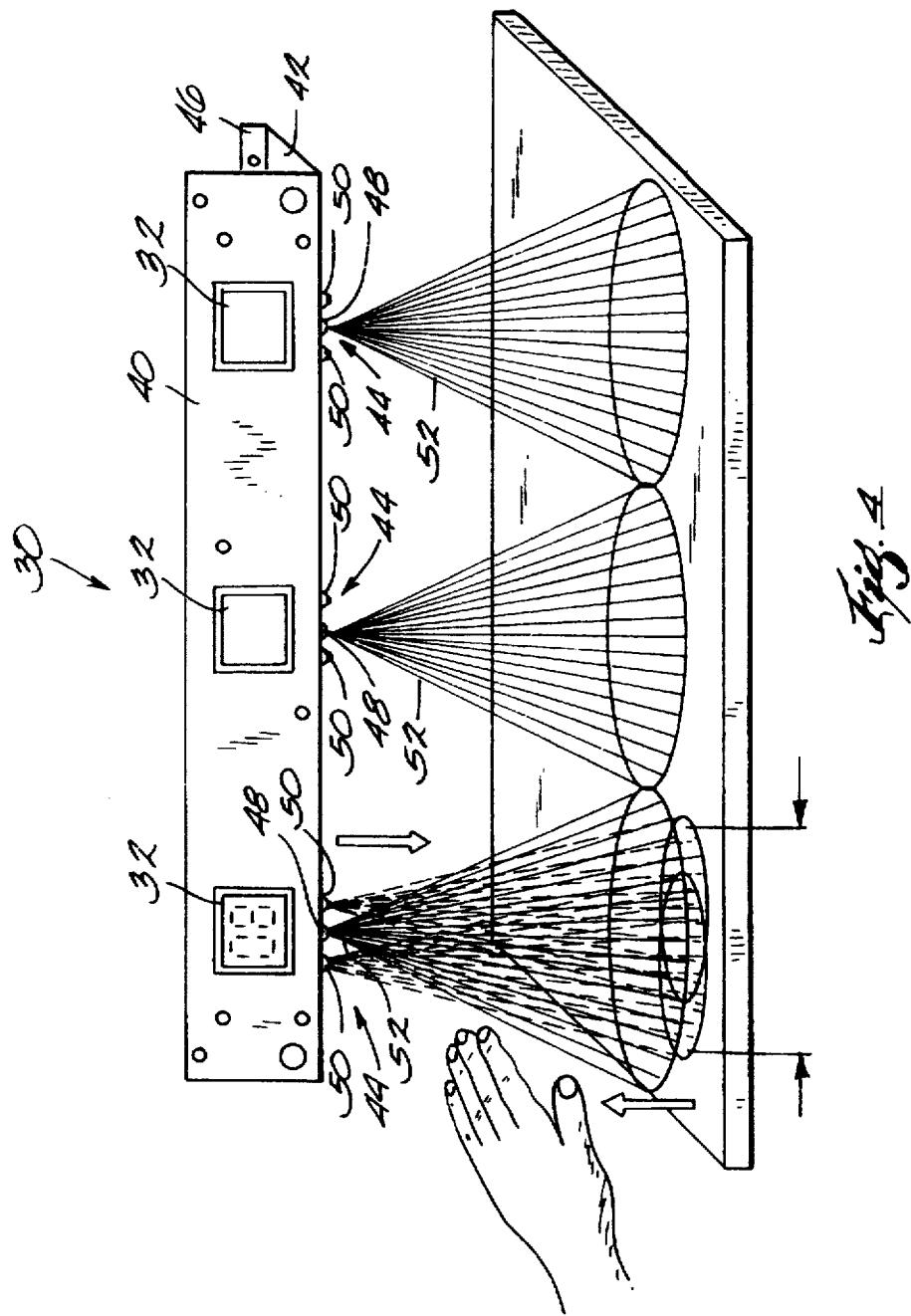
FIG. 4 is a perspective view of apparatus embodying the present invention, and particularly illustrating the shape of the volume being illuminated and detected by the system.

As best shown in FIGS. 2–4, each modular unit 30 includes three displays 32 which are preferably light emitting diode displays, but which may be liquid crystal displays, or other displays, if desired. With the system as generally configured, the displays need only have two digits, but displays which include more digits or more information may be utilized, if desired. The modular units 30 are adapted to be attached to a frame structure (FIG. 1) which provides support for the bins 18,20 or larger units which are supported on a shelf structure of the frame which has end panels 34. As best shown in FIG. 4, the modular units 30 have a front face 40 and a bottom portion 42 in which sensing means 44 are mounted. A rear portion 46 is also provided for attachment to the frame.

Each modular unit 30 has three sensing means 44 as well as three displays 32. Each sensing means 44 comprises an infrared detector 48 and a pair of infrared light emitting diodes 50. The detectors are TFMS 5400 units as manufactured by Temic Semiconductor Company of Germany and are readily available at an inexpensive cost. The detector 48 is designed so that it detects only light that is reflected from an object or surface that is below the detector and is not able to detect light emanating directly from the LED's 50. As shown in FIG. 4, the light emitting diodes 50 emit a conical shaped beam that is adapted to illuminate the entrance and forward part of each bin and the detector 48 is adapted to monitor a conical shaped volume and provide an output signal that is a function of the amount of detected light.

In accordance with an important aspect of the present invention and as will be hereinafter described in more detail, the infrared light that is emitted by the light emitting diodes 50 is modulated at a frequency of preferably 40 kHz and the detector 48 is one which is tuned to the same modulation frequency so that only reflected light at this predetermined frequency is detected which effectively eliminates the influence of ambient light or infrared radiation of other frequencies. The intensity of the light emitting diodes 50 can also be adjusted so that the amount of reflected light can be varied to optimize the performance of the system. To this end, and referring particularly to FIG. 2, the left LED's 50 are shown to be emitting light and the detector 48 is adapted to detect reflected light anywhere within its conical volume, indicated generally at 52.

The operation of the detector 48 is such that it produces a high output signal when the amount of light exceeds its sensitivity threshold. During operation, the LED's 50 are controlled so that the reflected light off of the bottom of the bin 18 or the components within it result in reflected light that is detected and the intensity is controlled so that the reflected light is close to the sensitivity threshold. This results in an intermittent or occasional high output signal during operation without any transient objects, such as a worker's hand being present. With the light being controlled so that the detector is at the edge of its sensitivity threshold, when a worker puts his hand in the bin to pick a part, the amount of reflected light increases dramatically and results in the detector generating a solid continuous high output signal as is desired and this signal is applied to a microprocessor for screening or confirmation. If it is high for a sufficient period of time, then it is confirmed as a worker's hand is present within the bin and the system then controls the display 32 for that bin to alter its characteristic for a predetermined period of time and then extinguish the display.

With respect to the alteration of the character of the display, it is preferred that it provide a dimmed display of the number of parts or items that are to be picked from that bin. While dimming is preferred, it is possible that the display may be blinked, or some other visual indication could be provided. The time duration of the alteration of the display is preferably generally proportional to the number of parts that are to be removed from that particular bin.

It is preferred that the time duration be a unit of time plus one additional unit of time for each component that is to be picked. In other words, a single component would have a time duration of two time units, and a four component number would have a time duration of five time units. The time units can be variable and typically would be one half to one second, although a greater or smaller number can be used. After the prescribed number of time units has expired, the display is extinguished, until the entire inventory is reset and another kit is to be assembled.

The circuitry that is contained within each modular unit 30 is shown in FIGS. 8a and 8b which together comprise a single electrical schematic circuit diagram. The bulk of the circuitry shown in FIGS. 8a and 8b are present in each modular unit 30, the only exception being the lines 60 which extend to other modular unit circuits and to a concentrator processing means 62 which is adapted to communicate with each modular unit. Each modular unit has a microprocessor 64 with associated memory 66 and an electrically erasable programmable read-only memory (EEPROM) 68 in which adjustable parameters are stored for operating the system. A watchdog timer 70 is provided which provides a reset signal to the microprocessor 64 in the event that normal operation of the microprocessor 64 fails to provide a recurring pulse to the watchdog timer 70. Communication from the microprocessor 64 to the concentrator processing means 62 is carried out via lines 72 to a driver 74 and lines 76 which are connected by jacks to lines 60. The memory 66 has output lines on the right side thereof which extend to a driver buffer 80 that is connected to a number of eight segment LED's 32. The memory 66 also has other lines that extend to a four-to-ten line decoder 82, which has output lines that are connected to another buffer 84 and to the display LED's 32. The signals on lines that extend to the decoder 82 and the driver buffer 80 sequentially and rapidly update each digit of the three LED displays 32 in a manner well known to those of ordinary skill in the art.

The output lines 86, 88 and 90 from the decoder 82 also extend to one input of respective AND gates 92, 94 and 96, the other input of which is supplied by a 40 Hz signal generated by a crystal circuit, indicated generally at 98. The output of the AND gates 92, 94 and 96 are connected through a driver 100 to the left, middle and right pairs of light emitting diodes 50 that have been previously discussed. The diodes 50 are driven by a FET transistor 102 that is controlled by an electronic digital potentiometer 104 which in turn is controlled via lines 106 from the microprocessor 64. The electronic digital potentiometer 104 is controlled by the microprocessor to control the intensity of the light being emitted by the LED's 50 via the field effect transistor 102. The control lines 86, 88 and 90 control the gates 92, 94 and 96 so that a 40 kHz frequency switched signal operated each of the left, middle and right pairs of LED's 50. During operation, the microprocessor activates only one of the lines 86, 88 and 90 at a time so that only the left, middle or right pairs of LED's 50 are powered at a time. Each of the pairs of LED's 50 are operated to be on for one-half of a cycle and off for the other half.

The light emitting detectors 48 shown in FIG. 8a are adapted to detect only 40 kHz infrared radiation and each of these left, middle and right detectors have their outputs connected to a gate array 108 so that the output thereof is applied to line 110 that is input to an interrupt port of the microprocessor 64. The particular one of the left, middle and right detectors is controlled by selectively activating lines 112 via the memory 66. Each of the detectors 48 is adapted to provide a high output if the sensitivity threshold of the detector is exceeded. Thus, when the gate array 108 is controlled via lines 112, the output of one of the detectors 48 is input to the microprocessor 64 interrupt port. The signal from the detectors is high when the amount of light detected is above a threshold level. When this occurs, a true signal on line 110 is applied to the interrupt port (pin 15) of the microprocessor 64. A true signal on this line initiates a counter which accumulates a count for the duration of the presence of a true signal on line 110. If there is an intermittent true signal such as would occur if the light level was right at the threshold for the detector 48, then a solid true signal would not be obtained. If, however, there were a solid true signal, indicating that someone's hand or other transient object were present, then the duration of such a solid signal must then be examined to effectively distinguish between someone's hand and some other transient object, such as a flying insect, for example.

Figure 5:
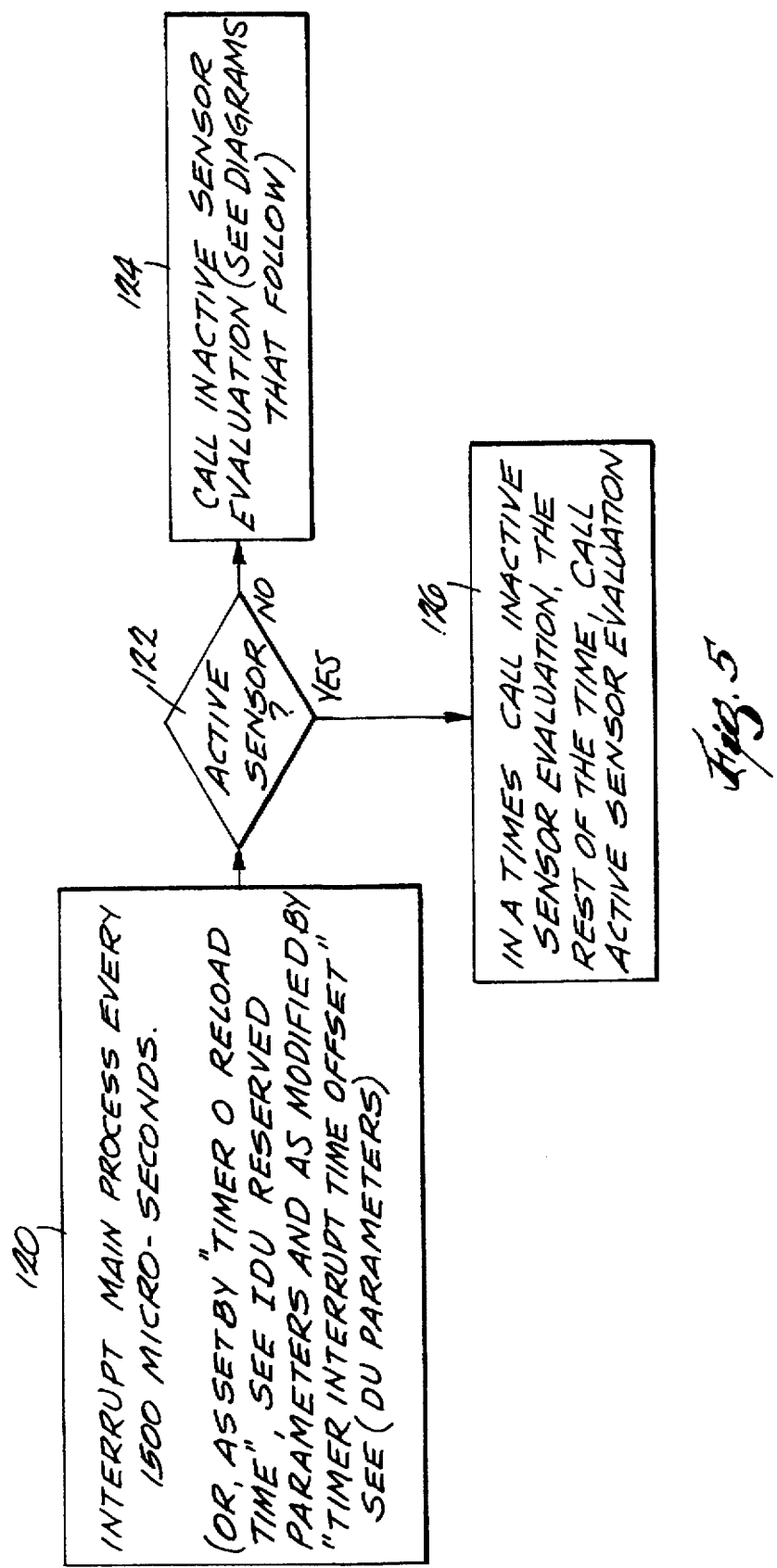
FIG. 5 is a flow chart illustrating the sensing means timer interrupt routine of the present invention.

Referring to FIG. 5, which is a flow chart of the timer interrupt, it is seen that the microprocessor 64 examines the interrupt port preferably every 1500 microseconds (block 120). This is programmable, however, and is determined by the parameters that are set in the EEPROM 68. Preferably every 1500 microseconds, the routine controls whether a sensor is active or not. If not, it calls an inactive sensor evaluation (block 124), but if yes, it calls the active sensor evaluation (block 126).

With respect to the inactive sensor evaluation, the block diagram of FIG. 6 controls the operation of the system, and begins with the sensor or detector 48 receiving radiated 40 kHz infrared light (block 128) which is light that is reflected from a bin as a result of the light emitting diodes 50 for that bin being operated. The microprocessor controls the gates 108 to input the output signal on line 110 to the interrupt port and the microprocessor counter accumulates a count that indicates the capture time (block 130) that radiated light is received. If this capture time $T_R$ is less than the sensitivity set point S (block 132), then the result is scaled to insure that there is a trend (block 134) and if digital potentiometer setting is less than maximum (block 136), then the value of the digital potentiometer is increased (block 138) to increase the intensity of the light being emitted by a particular pair of light emitting diodes 50. If the digital potentiometer is already at maximum setting, then no action is taken. Similarly, if the capture time $T_R$ is greater than the setpoint (block 140), then the digital potentiometer is decreased (block 142) provided that the digital potentiometer setting is greater than zero (block 144). If not, then no action is taken. Thus, the operation of the system is such that when there are no transient objects in a bin, the detectors are used to control the amount of light being emitted by a light emitting diode pair so that the sensitivity threshold is nearly reached. This results in reliable operation in that if a hand is inserted into the bin, then the sensitivity threshold will be insured to be exceeded and reliable operation can be obtained.

When a detector is active, the system uses the active sensor evaluation routine as shown in FIG. 7. A detector 48 which receives radiated light (block 150) is gated (block 152) to the micro and the capture time $T_R$ of radiated light is determined (block 154). Similarly, nonradiated light 156, which is stray light at the 40 kHz frequency, is also measured and gated to the interrupt port of the microprocessor (block 158) and the capture time $T_R$ of nonradiated light is also measured (block 160) and averaged (block 162). The average nonradiated capture time is subtracted from the radiated captured time (block 164) and this result is then measured to determine if it exceeds the threshold for a hand or transient object (block 166). If no, no action is taken, but if yes, then it increments a counter (block 168) to provide a number of hits (block 168) which if exceeding a predetermined number (block 170), means that a hand is most likely present in the bin. Since the inquiry occurs every 1500 microseconds, the presence of a hand in a bin that is detected will increment the count quite rapidly and it has been found that 13 is an appropriate number of consecutive hits that reliably indicate that a hand is present. If a moth or other transient object goes very rapidly in and out of the bin, then the system will probably not confirm that a hand is present. The parameters that are utilized by the system are set forth in the following table 1 and it should be understood that these values are set in the EEPROM 68.

TABLE 1

| Name | Address | Size (Bytes) | Value | Meaning | Parameter String | Description |
|---|---|---|---|---|---|---|
| IDUAddress | 0 | 1 | 251 | Default IDU address | — | Modular unit's address on network |
| NumHits | 1 | 1 | 13 | x0.009 = 0.117 s | 013 | Number of consecutive hits detected for indicating that a hand has been detected |
| OnOffFeatures | 2 | 1 | 0 | All features off | 000 | Features selectable in maintenance program. |

TABLE 1-continued

| Name | Address | Size (Bytes) | Value | Meaning | Parameter String | Description |
|---|---|---|---|---|---|---|
| DPMax | 3 | 1 | 70 | 70% | 070 | Digital potentiometer maximum value |
| IRSenseSet | 4 | 2 | 50 | 3% | 050 000 | IR Sensitivity Set (Inactive sensor adjusts to this value) |
| IRSenseAvg | 6 | 1 | 10 | x0.009 = 0.09 s | 010 | Time period for averaging calculation done on inactive sensor adjustment |
| IROffset | 7 | 1 | 200 | 200 μs | 200 | TimerOTime parameter is offset by this amount of time if modular unit address parameter is an even number |
| IRMadeMin | 8 | 2 | 798 | 53% | 030 003 | Active sensor is blocked when light returned is higher than this percentage of the 1500 μs infrared light radiating period |
| IRError | 10 | 2 | 50 | 3% | 050 000 | An error has occurred when light received by a sensor during the nonradiating period is above this percentage |
| DimTime | 12 | 2 | 333 | x0.009 = 3 x | 077 001 | Time for which dimmed digits are displayed after a hand has been seen by the associated sensor |
| TimerOTime | 14 | 2 | −1500 | −1500 μs | 036 250 | Nominal time before next TO interrupt |
| BaudRate | 16 | 1 | 236 | 19200 Baud | 236 | Communication Baud rate (217 = 9600 Baud) |
| NonRadDivisor | 17 | 1 | 4 | ÷16 | 004 | Power of 2 to divide by for nonradiating average |
| NonRadWidth | 18 | 1 | 30 | | 030 | Sum width of nonradiating average calculation |
| ActAdjRatio | 19 | 1 | 16 | 1 in 16 | 016 | Ratio for digital pot "active drift" adjustment |

It should be understood that each pair of LED's 50 have their intensity controlled during operation. As previously mentioned, the left, middle and right pairs of LED's 50 are sequentially illuminated so that each pair is cycled on and off approximately every 1500 milliseconds. The control of the digital potentiometer 104 is done for each pair based upon the value that resulted in the appropriate amount of light being detected as was described in connection with FIG. 6. For a particular pair of LED's 50, the last value is stored in memory 66 so that when it is to be turned on, the control lines 106 set the digital potentiometer 104 at the last level for that pair unless the evaluation described with respect to FIG. 6 calls for an increase or a decrease in the level.

From the foregoing description, it should be understood that an improved system for use in assembling parts has been shown and described which offers many advantages over prior art systems. The system is adapted for use in filling orders, or kitting, or inventory placement and has special features which make it flexible, adaptable and convenient to use and reconfigure as well as expand. Bin sizes are configurable and there is no conscious verification required by the workers. The system promotes fast and accurate picking and has unique sensor means which are very reliable in their operation, but utilize inexpensive components.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. Apparatus for use in assembling multiple object assemblies, wherein various objects are located in individual bins, said apparatus comprising:
   a frame structure adapted to define a plurality of bins located adjacent one another in at least one row;
   a plurality of sensor means associated with preselected bins, said sensor means being adapted to detect the presence-and duration of access by a hand in an area of said associated bin, said sensor means generating an electrical signal responsive to a hand being detected;
   a plurality of display means associated with preselected bins, said display means being adapted to provide a visual display of component quantities responsive to electrical signals being received, said display means being adapted to provide said visual display in at least first and second display modes upon activation;
   processing means adapted to receive said signals from said sensor means and generate said signals and apply the same to said display means, and having a communication port for connecting a programming means to program said processing means so that a predetermined quantity is initially displayed at predetermined bins, said display means at each predetermined bin changing from said first display mode to said second display mode responsive to a hand being initially detected, said display means operating in said second display mode for a predetermined time that is directly proportional to the quantity visually displayed for each bin.

2. Apparatus as defined in claim 1 wherein each of said sensor means is supported by said frame structure.

3. Apparatus as defined in claim 1 wherein the size of each of said bins can be varied to accommodate different sized components, each bin having at least one of said display means associated therewith.

4. Apparatus as defined in claim 1 wherein said first display mode displays said quantity at a first intensity value, and said second display mode displays said quantity at a different intensity value.

5. Apparatus as defined in claim 1 wherein said first display mode displays said quantity at a first intensity value, and said second display mode displays a blinking quantity display at said first intensity value.

6. Apparatus as defined in claim 1 wherein said processing means is adapted to selectively activate and deactivate each of said display means.

7. Apparatus as defined in claim 1 wherein said sensor means comprises a light producing means adapted to direct a beam of light into at least a portion of each said preselected bin and a light detecting means adapted to detect the intensity of reflected light in said portion of said preselected bin, said light detecting means generating an electrical intensity signal proportional to said detected light intensity, said detecting means producing an intensity signal indicative of greater intensity when a hand is present in said preselected bin.

8. Apparatus as defined in claim 7 wherein said light producing means is capable of producing light having a variable intensity, said processing means being adapted to control said light producing means to produce a predetermined light intensity to result in a predetermined detected light intensity by said light detecting means during calibration of a stationary target for a predetermined time period.

9. Apparatus as defined in claim 8 wherein said light producing means comprises at least one variable intensity infrared light emitting diode.

10. Apparatus as defined in claim 9 wherein each of said light producing means and light detecting means have a programmable operating frequency, said light detecting means and light producing means for each bin being programmable, thereby enabling said light producing means and light detecting means to operated at a frequency in a subject bin that is different from the frequency of operation of said light producing means and light detecting means in an adjacent bin.

11. Apparatus as defined in claim 10 wherein said light detecting means is adapted to generate said electric signal when the detected light intensity is above an adjustable detected intensity threshold.

12. Apparatus as defined in claim 9 wherein said light producing means comprises a pair of said light emitting diodes located on opposite sides of said light detecting means operatively connected to said frame structure above said bin, said light emitting diodes producing a generally conical volume of light in said bin, said light detecting means being adapted to detect a steady state light intensity from light reflected from stationary objects and the uncovered bottom of said bin.

13. Apparatus as defined in claim 1 wherein said apparatus includes multiple rows of bins, said bins being of variable size to retain different quantities and sizes of objects, there being at least one sensor means and at least one display means for each bin, said processing means being adapted to extinguish selected display means that are associated with one of said bins that has more than one sensor means and display means associated therewith.

14. A system for use in assembling multiple component assemblies wherein various components are located in a plurality of bins arranged in at least one row of bins, said apparatus comprising:

a frame structure providing support for each row of bins, and providing vertical spacing between rows in the event more than one row of bins is provided;

a plurality of at least one type of modular unit connected to said frame structure, each unit being associated with a predetermined number of minimum sized bin areas, said unit comprising:

a sensor means for each of said bin areas, each said sensor means being adapted to detect the presence and duration of access of a transient object in said bin area, and generating an electrical signal indicative of a transient object being detected;

a display means for each of said bin areas, each said display means being selectively operable and adapted to provide a visual display of quantities of components to be removed for one of the assemblies responsive to display signals being received, said display means being adapted to provide said visual display in at least first and second display modes upon activation;

unit processing means adapted to receive said signals from said sensor means and generate said display signals and apply the same to said display means, and having a communication port for connecting to a concentrator processing means, each operable one of said display means at each predetermined bin area changing from said first display mode to said second display mode responsive to a transient object being initially detected, said display means operating in said second display mode for a predetermine time that is directly proportional to the quantity displayed for each bin;

concentrator processing means connected to each of said unit processing means and being adapted to program each of said unit processing means so that a predetermined quantity is initially displayed at predetermined bins.

15. A system as defined in claim 14 wherein the size of a bin can be increased to include multiple bin areas, extending beyond a single modular unit to accommodate different sized components.

16. A system as defined in claim 14 wherein said sensor means comprises a light producing means adapted to direct a beam of light into said bin area and a light detecting means adapted to detect reflected light in said area, said light detecting means generating an electrical intensity signal proportional to said detected light intensity, said detecting means producing an intensity signal indicative of greater intensity when a transient object is present in said bin area.

17. A system as defined in claim 14 wherein said concentrator processing means is adapted to selectively control each display means to be operable or inoperable so that a bin that is larger than minimum size and having more than one display means could be controlled to have only one operable display means.

18. A system as defined in claim 16 wherein said unit processing means receives said intensity signals generally continuously and detects a transient object when said intensity signals exceed a predetermined threshold intermittently over a predetermined number of successive times.

19. Apparatus for use in a worker assembling multiple component assemblies wherein various components are located in a plurality of bins arranged in at least one row of bins, said apparatus being adapted to provide a normal display of the number of components that are to be removed from each bin during an assembling process, and when a worker's hand is in a bin, to provide an altered display, comprising:

a sensor means for sensing generally predetermined sized areas of said bins, said sensor means being adapted to detect the presence and duration of access by a worker's hand in said area, said sensor means generating an output signal that varies over time in proportion to the amount of reflected light detected at at least one display means for each bin, said display means being adapted to provide said numerical display of component quantities, said display means being adapted to provide said altered display responsive to a control signal being received;

processing means adapted to receive said output signal from said sensor means and selectively generate said control signal and apply the same to said display means, said processing means measuring the magnitude and form of said output signal over a predetermined time period and producing said control signal when the magnitude and form satisfy predetermined criteria.

20. Apparatus as defined in claim 19 wherein said altered display is dimmer than said normal display.

21. Apparatus as defined in claim 19 wherein said sensor means comprises a light producing means adapted to direct a beam of light into said bin area and a light detecting means adapted to detect reflected light in said area, said light detecting means generating said output signal proportional to said detected light intensity.

* * * * *